(12) United States Patent
Yin et al.

(10) Patent No.: US 11,423,689 B1
(45) Date of Patent: Aug. 23, 2022

(54) IDENTIFICATION METHOD FOR AN IDENTIFICATION SYSTEM

(71) Applicant: Guangzhou Tyrafos Semiconductor Technologies Co., Ltd., Guangzhou (CN)

(72) Inventors: Ping-Hung Yin, Taipei (TW); Jia-Shyang Wang, Miaoli County (TW)

(73) Assignee: Guangzhou Tyrafos Semiconductor Tech. Co., Ltd., Guangzhou (CN)

( * ) Notice: Subject to any disclaimer, the term of this patent is extended or adjusted under 35 U.S.C. 154(b) by 0 days.

(21) Appl. No.: 17/666,690

(22) Filed: Feb. 8, 2022

Related U.S. Application Data

(60) Provisional application No. 63/147,582, filed on Feb. 9, 2021.

(30) Foreign Application Priority Data

Nov. 19, 2021 (TW) .................................. 110143263
Jan. 19, 2022 (TW) .................................. 111102224

(51) Int. Cl.
  *G06V 40/13* (2022.01)
  *H04N 5/235* (2006.01)
  *G06V 40/12* (2022.01)
(52) U.S. Cl.
  CPC ...... *G06V 40/1318* (2022.01); *G06V 40/1335* (2022.01); *G06V 40/1376* (2022.01); *H04N 5/2353* (2013.01)

(58) Field of Classification Search
  CPC .......... G06V 40/1318; G06V 40/1335; G06V 40/1376; H04N 5/2353
  See application file for complete search history.

(56) References Cited

U.S. PATENT DOCUMENTS

| | | | |
|---|---|---|---|
| 2015/0286864 A1* | 10/2015 | Gottemukkula | G06T 11/60 382/117 |
| 2016/0232401 A1* | 8/2016 | Hoyos | G06V 40/1371 |

* cited by examiner

*Primary Examiner* — Abhishek Sarma
(74) *Attorney, Agent, or Firm* — Lin & Associates Intellectual Property, Inc.

(57) ABSTRACT

Provided is an identification method for an identification system, which includes a sensing area and an image sensor. First, a test object is close to the sensing area, so that the image sensor generates a dynamic image. Next, the test object gradually pressurizes the sensing area. Then, the test object completely covers the sensing area, and the image sensor further produces a perspective image. Finally, an identification module is used to determine whether the dynamic image is a biological image according to the perspective image, and to perform a subtraction operation on the dynamic image as a basis to determine whether to unlock the identification system. Therefore, the identification system and the identification method can achieve a real-time determination on whether the dynamic image is a biological image. Also, the identification method greatly improves the false acceptance rate (FAR) and the false rejection rate (FRR) of the identification system.

8 Claims, 15 Drawing Sheets

IDENTIFICATION METHOD FOR AN IDENTIFICATION SYSTEM

CROSS-REFERENCE TO RELATED APPLICATIONS

This application claims the priorities of U.S. provisional patent application No. 63/147,582, filed on Feb. 9, 2021, Taiwanese patent application No. 110143263 filed on Nov. 19, 2021, and Taiwanese patent application No. 111102224 filed on Jan. 19, 2022, which are incorporated herewith by reference.

BACKGROUND OF THE INVENTION

1. Field of the Invention

The present invention relates generally to an identification system, and more particularly, to an identification method for the identification system.

2. The Prior Arts

The fingerprint identification technology has become the standard equipment of most smart phones since its development. The advantage of fingerprint identification is that the fingerprint is a unique feature of the human body, and the complexity of the fingerprint is sufficient for identification. In addition, when the reliability needs to be increased, it is only necessary to register more fingerprints to identify more fingers, up to ten, and each fingerprint is unique. Furthermore, scanning fingerprints nowadays is very fast and easy to use, which is one of the main reasons that fingerprint identification technology achieves high market share.

However, fingerprint identification is not absolutely safe. People leave their fingerprints in many publicly visited places every day. It is therefore not difficult for someone to obtain fingerprint information of others. Once the fingerprint is obtained and restored, personal devices and information security are at risk. Moreover, compared to password, the password can be reset even if cracked, but the fingerprint cannot be reset. Hence, how to improve the security and identification ability of fingerprint identification is one of the problems that R&D personnel should solve.

In addition, the identification capability index in fingerprint identification technology is an important index. The identification capability index represents an index for evaluating or comparing the performance of the biometric security system, including the false acceptance rate (FAR) and the false rejection rate (FRR). It should be further explained that the FAR indicates the probability that the biometric identification system will mistakenly identify an illegal user as a legitimate user, which is related to the safety level of the biometric identification system; the FRR indicates that the biometric identification system will mistakenly determine a legitimate user as an illegitimate user, which is related to the convenience of the biometric system. Therefore, how to reduce the FAR and increase the FRR is one of the issues to be solved by R&D personnel.

Therefore, it is imperative to address the above-mentioned deficiencies with an enhanced design.

SUMMARY OF THE INVENTION

A primary objective of the present invention is to provide an identification method, which uses an image sensor to generate a dynamic image of the test object in a time range, and the dynamic image includes a plurality of interval images, wherein the time range includes a plurality of exposure intervals, and the latter the part of the time range, the clearer the interval image, so that the image sensor produces a perspective image. The perspective image is used to determine whether the dynamic image is a biological image. As such, it can effectively prevent others from using fingerprint images, pictures, or other models to crack the identification system, thus increases the security and identification capabilities of the identification system.

Another objective of the present invention is to provide an identification method, which is to use a processing module to execute an algorithm, which subtracts dynamic images of different exposure intervals from each other, so that the ridge valley (RV) value of the dynamic image according to the present invention is greatly increased, resulting in a better fingerprint identification effect. Thereby, the FAR and FRR of the identification system according to the present invention are greatly improved to achieve the high accuracy and wide applicability.

To achieve the above objectives, the present invention provides an identification method, applicable to an identification system having a sensing area, an image sensor, and an identification module coupled to the sensing area and the image sensor, the identification method includes the following steps: an activation step, a test object touching the sensing area, the image sensor being activated and generating a dynamic image; a sensing step, the test object progressing from touching to completely covering the sensing area so that the image sensor further generates a perspective image; and an identification step, determining whether the test object is a biological image according to the perspective image, if the test object has a change process of the dynamic image and the perspective image, the identification module determining that the dynamic image is a biological image; otherwise, the identification module determining that the dynamic image is a non-biological image.

Preferably, according to the identification method of the present invention, the dynamic image comprises a plurality of interval images generated by the test object in a time range and the identification module determines whether the dynamic image has the change process according to whether sharpness values of the interval images exceeds a threshold value; when one of the sharpness values exceeds the threshold value, the identification module determines that the dynamic image has the change process.

Preferably, according to the identification method of the present invention, the sharpness value is calculated by one of the image difference value method and the image gradient value method.

Preferably, according to the identification method of the present invention, the image sensor further comprises: a plurality of light sensors arranged in an array, wherein the light sensors are used to generate a plurality of image intensities information, and the dynamic image is generated by the image intensity information; a plurality of complementary metal-oxide semiconductors (CMOS), coupled to the light sensors, wherein the CMOS are used to control an output of the image intensity information, but the present invention is not limited hereto.

Preferably, according to the identification method of the present invention, the image sensor is disposed below the sensing area, the image sensor has a shutter mechanism, and the shutter mechanism is used to control an exposure interval.

Preferably, according to the identification method of the present invention, the shutter mechanism is a global shutter (GS), so that the light sensors are exposed at the same time to generate the image intensity information, but the present invention is not limited hereto.

In addition, in order to achieve the above-mentioned objectives, the present invention, based on the above-mentioned identification system, further provides an identification method for executing the above-mentioned identification system, which comprises: an activation step, a test object approaching a sensing area, when the test object touches the sensing area, the image sensor being activated and generating a dynamic image for the test object, wherein the dynamic image comprises a plurality of interval images; a subtraction step, a processing module executing an algorithm to perform a subtraction operation on the interval images with each other, and generating a plurality of subtracted signals; a signal amplification step, an operation module amplifying the subtracted signals by multiples, so that peaks and valleys of the amplified subtracted signals are sharp and within a signal processing range; and an identification step, an identification module using the amplified subtracted signals as a basis to determine whether to unlock the identification system.

Preferably, according to the identification method of the present invention, after the signal amplification step is performed, the identification method further comprises: an averaging step, the operation module taking an average value of the subtracted signals; wherein the identification step further uses the identification module and the average value as the basis to determine whether to unlock the identification system.

Preferably, the identification method according to the present invention further comprises a selection step, the processing module uses one of the interval images as a background interval image; wherein the subtraction step further comprises performing a subtraction operation between the background interval image and the interval images to generate the subtracted signals.

In summary, the identification method provided by the present invention mainly uses the image sensor to generate a dynamic image for the test object in a time range, wherein the time range comprises a plurality of exposure intervals, and the longer the exposure interval is, the sharpness value of the interval image of the dynamic image will exceed the threshold value, and the image sensor further generates a perspective image; based on whether the dynamic image has a change process and the perspective image, the present invention determines whether the dynamic image is a biological image. As such, it can effectively prevent others from using fingerprint images, pictures, or arbitrary models to crack the identification system, thereby greatly increasing the security and identification capabilities of the identification system. In addition, the processing module executes an algorithm that subtracts the dynamic images at different exposure time intervals from each other and then takes the average value, so that the ridge valley value of the dynamic image is greatly increased, thereby resulting in a better fingerprint identification effect. Therefore, the FAR and FRR of the identification system according to the present invention are greatly improved to achieve the goals of high accuracy and wide applicability.

In order to enable those skilled in the art to understand the purpose, features, and effects of the present invention, the following specific embodiments and accompanying drawings are used to explain the present invention in detail as follows.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
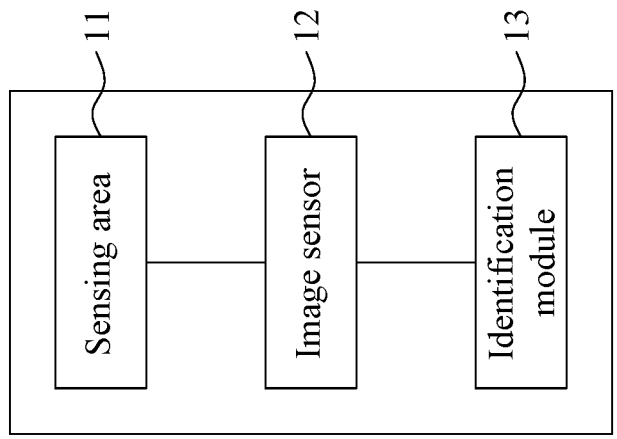
FIG. 1 is a schematic view of an identification system according to the present invention.
Figure 2:
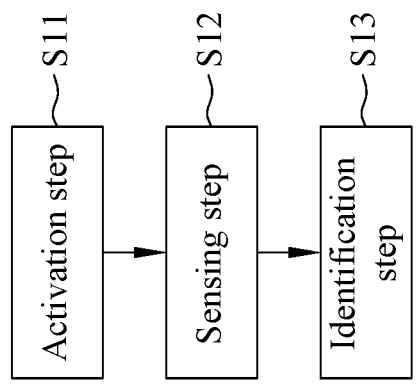
FIG. 2 is a block diagram illustrating the steps of the identification method of the present invention.
Figure 3:
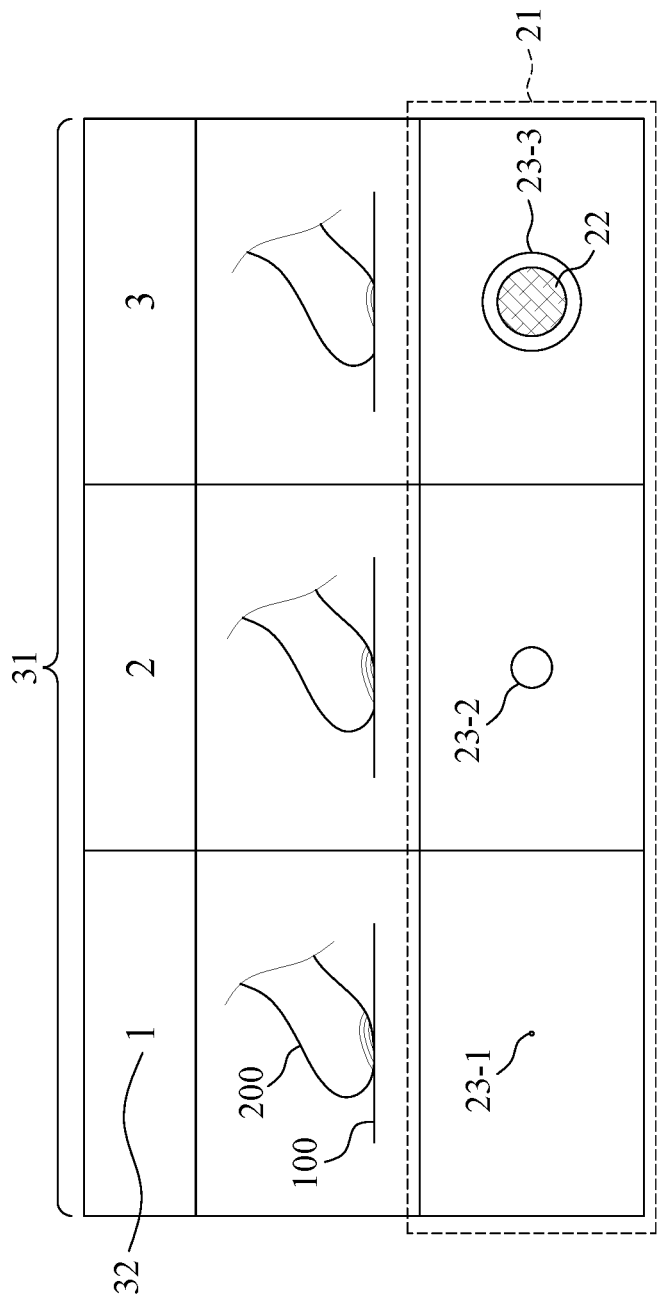
FIG. 3 is a flowchart illustrating the steps of actual execution process of the identification method of the present invention.

Refer to FIGS. 1-3. FIG. 1 is a schematic view of the identification system according to the present invention; FIG. 2 is a block diagram illustrating the steps of implementing the identification method of the present invention; and FIG. 3 is a flowchart illustrating the steps of actual execution of the identification method of the present invention. As shown in FIG. 1, the identification system 100 according to the present invention includes: a sensing area 11, an image sensor 12, and an identification module 13.

Specifically, the sensing area 11 of the present invention is used for the test object 200 to approach to perform sensing. In some embodiments, the sensing area 11 can be used as an isolation structure of the identification system 100. In the present invention, the term "isolation" covers both electrical isolation and physical isolation. The identification system 100 may be a single layer of inorganic packaging materials, a multilayer stack of inorganic packaging materials, or a stack of a pair of inorganic packaging materials and organic packaging materials. The inorganic packaging materials used are, for example, but not limited to, silicon nitride (SiNx), silicon oxide (SiOx), silicon oxynitride (SiONx), aluminum oxide (AlOx), or titanium oxide (TiOx), but the present invention is not limited hereto.

Specifically, according to the present invention, the image sensor 12 is disposed below the sensing area 11, and has a shutter mechanism (not shown). The image sensor 12 is used for generating a dynamic image 21 of the test object 200 within a time range 31, wherein the dynamic image 21 includes a plurality of interval images 23 (23-1 to 23-8 shown in FIG. 4), and the time range 31 includes a plurality of exposure intervals 32, the shutter mechanism is used to control the exposure interval 32, and exposure interval 32 corresponds to the interval image 23. In some embodiments, the image sensor 12 may be a complementary metal-oxide semiconductor (CMOS) image sensor, and may be selected from a back-lit CMOS image sensor or a front-lit CMOS image sensor, but the invention is not limited hereto.

It should be further explained that, in some embodiments, the image sensor 12 may have one of a rolling shutter mechanism and a global shutter mechanism, wherein when the rolling shutter mechanism is used, the exposure time of the rolling shutter mechanism is different. Therefore, when the image sensor 12 shoots a dynamic image, the exposure times of the upper and lower half of the interval image 23 are different, which may cause the time difference that the upper half of the interval image 23 appears first while the lower half of the interval image 23 does not yet appear, which leads to the image distortion of the interval image 23. In a preferred embodiment of the present invention, since the present invention mainly aims at generating the dynamic image 21 within the time range 31 for the test object, in order to avoid the jelly effect (Jello Effect) in the interval image 23 of the dynamic image 21, the global shutter mechanism is adopted, that is, each pixel of all pixel arrays on the image sensor 12 simultaneously acquires the interval image 23 in the same exposure interval 32, but the invention is not limited to herein.

Specifically, according to the present invention, the identification module 13 is coupled to the image sensor 12, and the identification module 13 determines whether the dynamic image 21 is a biological image according to the perspective image 22. It should be further noted that, in some embodiments, the test object 200 may be a fingerprint of a human body, and the perspective image 22 may be a vein of a human body or related to a vein of a human body, and the identification module 13 uses the perspective image 22 of the veins of the finger captured by the image sensor 12 as the basis for determining whether the dynamic image 21 is a biological image, but the invention is not limited hereto. In the present invention, the word "biological image" refers to preventing others from cracking the identification system 100 with an image, picture, or arbitrary model of a fingerprint.

It is worth noting that, in some embodiments, the identification system 100 according to the present invention can execute an algorithm (not shown) to perform a subtraction operation on the interval images 23 of different exposure intervals 32, so as to greatly improve the ridge valley value (RV value) of the dynamic image 21, thereby resulting in a better fingerprint identification effect. Moreover, the subtraction operation described in the present invention may refer to subtracting the interval images 23 by subtracting one of the interval images 23 to reduce the noise value. In a preferred embodiment of the present invention, the subtraction operation is to subtract the interval image 23 of the previous exposure interval 32 from the interval image 23 of the subsequent exposure interval 32, and the obtained values are averaged after the subtraction operation is performed. It can be understood that, in the fingerprint identification system of the prior art, only the interval images 23 of different exposure intervals 32 are added to each other and then an average value is calculated, or the interval images 23 are added after only deducting the empty background value, and then an average value is calculated. However, because the difference between the deducted background value and the interval image 23 is too large, the noise in the interval image 23 cannot be effectively deducted. As a result, when the image in the interval image 23 is enlarged, the noise will be simultaneously amplified. In summary, the identification system according to the present invention executes an algorithm to perform a subtraction operation on the interval images 23 of different exposure intervals, which greatly improves the FAR and FRR of the identification system to achieve high accuracy and wide applicability.

To provide a further understanding of the structural features of the present invention, the use of technical means and the expected effects, the use of the present invention is described as follows:

Refer to FIG. 2 in conjunction with FIG. 3. The present invention is based on the above-mentioned identification system 100, and further provides an identification method for the identification system 100, which includes the following steps:

Activation step S11, the test object 200 touching the sensing area 11, the image sensor 12 being activated and generating a dynamic image 21 for the test object 200, wherein the dynamic image 21 comprises a plurality of interval images 23, and then proceed to step S12, sensing step.

Sensing step S12, the test object 200 progressing from touching to completely covering the sensing area 11 so that the image sensor 12 further generates a perspective image 22; and then proceed to step S13, identification step.

Identification step S13, if the test object 200 has a change process of the dynamic image 21 and the perspective image 22, the identification module 13 determining that the dynamic image 21 is a biological image.

It is worth noting that, as shown in FIG. 3, the identification system 100 according to the present invention can detect the authenticity of the dynamic image 21 of the test object 200 generated within the time range 31 through the interval images 23 of different exposure intervals 32 within the time range 31. For example, a fake fingerprint may not be like the fingerprint of the biological image, i.e., the dynamic image 21 gradually becomes larger and sharper within the time range 31 to generate the perspective image 22. Therefore, if the change process of the dynamic image 21 within the time range 31 is abnormal, the identification system 100 according to the present invention can confirm that the dynamic image 21 is not a living being, thus further improving the identification accuracy of the present invention.

It should be further explained that, in some embodiments, the identification module 13 is further based on whether the sharpness value (not shown) of the interval image 23 of the dynamic image 21 in the change process exceeds a threshold value (not shown) to determine whether the dynamic image 21 is a biological image. The sharpness value is calculated by one of the image difference value method and the image gradient value method, and the threshold value can be set by the user, or calculated through various algorithms, such as, calculating the average value, and the sharpness values of the past interval images 23. Wherein, the image difference value method first obtains the average value of the entire interval image 23, and then obtains the absolute value of the resulted difference by subtracting the average value from the image value of each pixel of the entire interval image 23, to obtain the difference value between adjacent pixels, and finally calculates the average value to obtain the sharpness value; the higher the sharpness value, the sharper the image. On the other hand, the image gradient value method mainly uses the discrete differentiation operator to perform vertical and horizontal convolution operations on each image value of the interval image 23, and the obtained image gradient value is used as the sharpness value, and the larger the sharpness value, the sharper the image, but the present invention is not limited to herein.

Thereby, the identification system 100 according to the present invention generates a dynamic image 21 for the test object within the time range 31 by the image sensor 12, and the dynamic image 21 includes a plurality of interval images 23, wherein the time range 31 includes a plurality of exposure intervals 32, and when the time range 31 is further close to the end, the interval image 23 is sharper, so that the image sensor 12 further generates a perspective image 22, and the change process of the dynamic image 21 (not shown) and the perspective image 22 are used to determine whether the dynamic image 21 is a biological image, so as to effectively prevent others from cracking the identification system with fingerprint images, pictures, or arbitrary models, and greatly increase the security and identification capability of the identification system 100.

Figure 4:
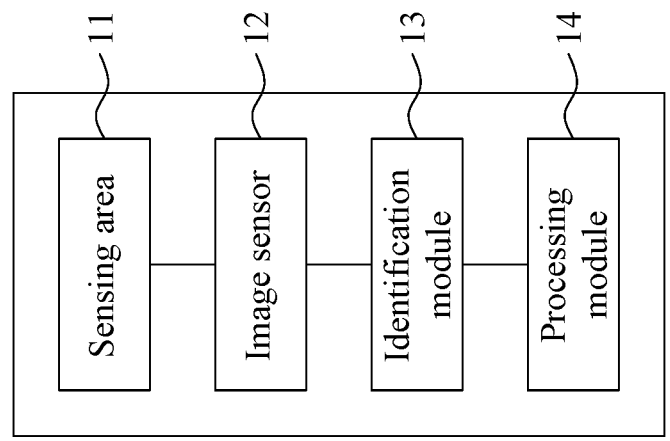
FIG. 4 is a schematic view illustrating the identification system according to the first embodiment of the present invention.
Figure 5:
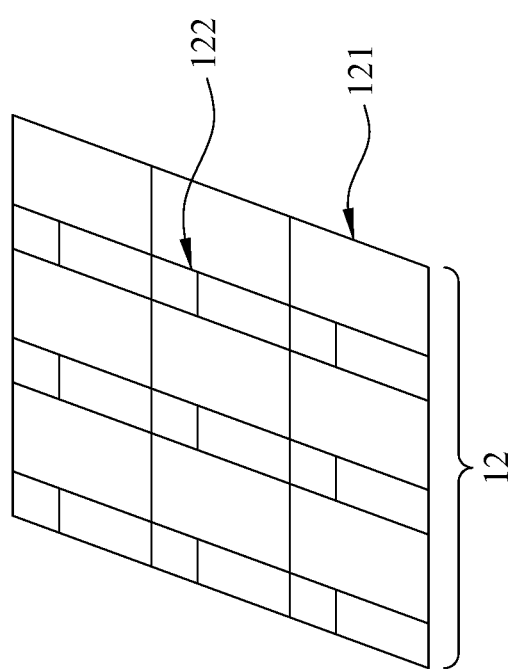
FIG. 5 is a schematic view of an image sensor according to the first embodiment of the present invention.
Figure 6:
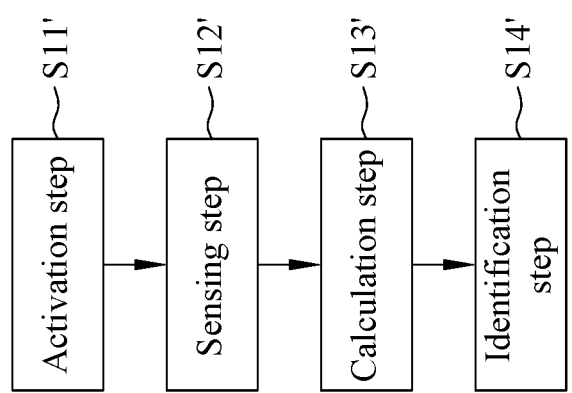
FIG. 6 is a block diagram illustrating the steps of the identification method according to the first embodiment of the present invention.
Figure 7:
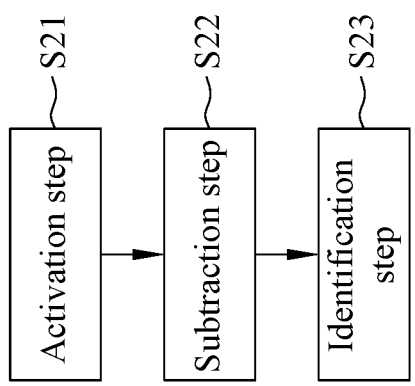
FIG. 7 is another block diagram illustrating the steps of the identification method according to the first embodiment of the present invention.
Figure 8:
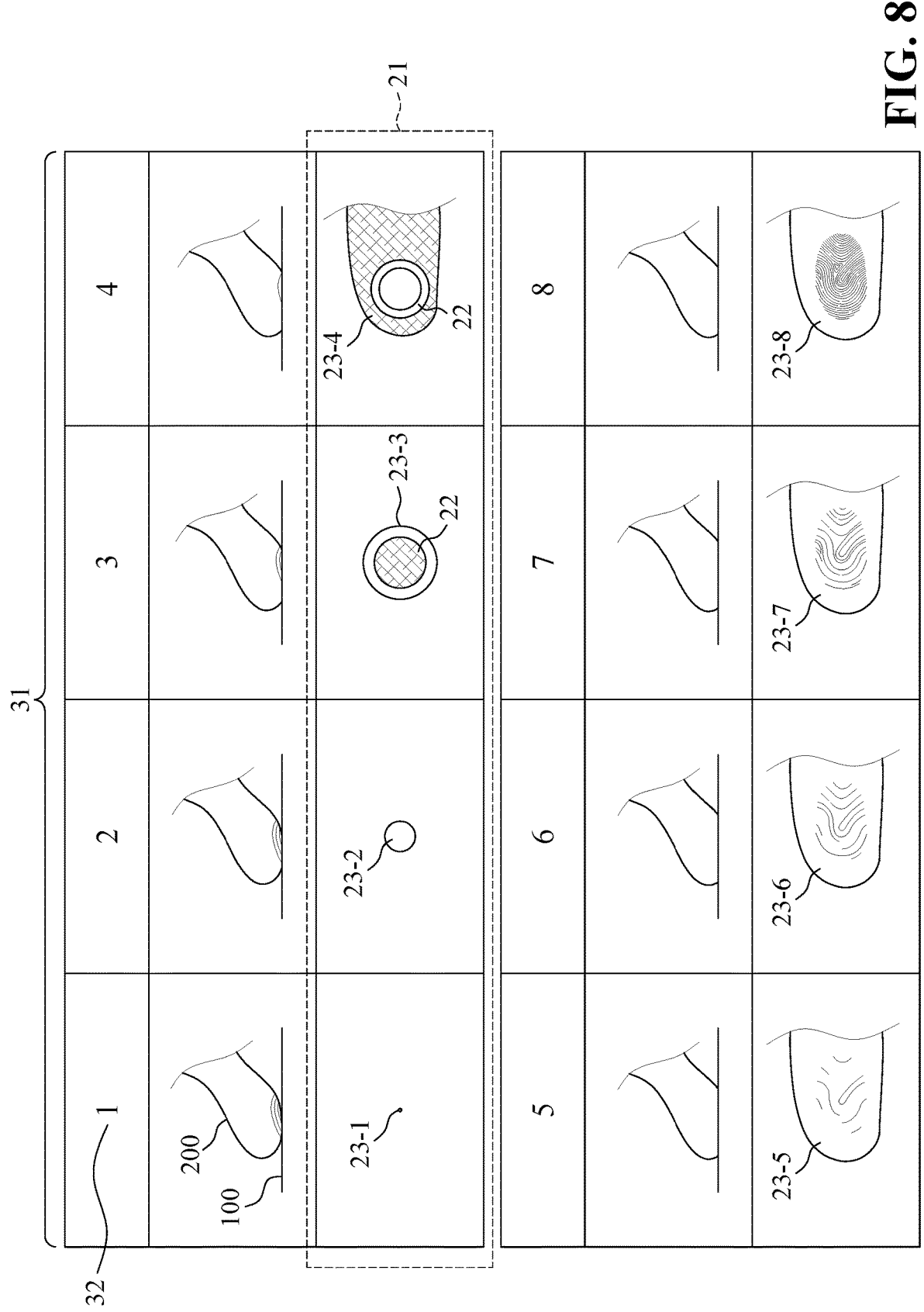
FIG. 8 is a diagram illustrating the actual execution process of the identification method according to the first embodiment of the present invention.

Refer to FIGS. 4-8. FIG. 4 is a schematic view illustrating the identification system according to the first embodiment of the present invention; FIG. 5 is a schematic view of an image sensor according to the first embodiment of the present invention; FIG. 6 is a block diagram illustrating the steps of the identification method according to the first embodiment of the present invention; FIG. 7 is another block diagram illustrating the steps of the identification method according to the first embodiment of the present invention; and FIG. 8 is a diagram illustrating the actual execution process of the identification method according to the first embodiment of the present invention. As shown in FIG. 4, the identification system 100 of the present invention includes: a sensing area 11, an image sensor 12, an identification module 13, and a processing module 14.

Specifically, referring to FIG. 4, the identification system 100 according to the first embodiment of the present invention further includes a processing module 14, coupled to the identification module 13, and the processing module 14 is for executing an algorithm to perform a subtraction operation on the interval images 23 and generate a plurality of subtraction signal (not shown), but the present invention is not limited to herein.

Specifically, referring to FIG. 5, the image sensor 12 according to the first embodiment of the present invention further includes a plurality of light sensors 121 and a complementary metal oxide semiconductor (CMOS) 122, wherein the light sensors 121 are arranged in an array, and the light sensors 121 are used to generate image intensity information (not shown), and generate a dynamic image 21 based on the image intensity information; the CMOS 122 is coupled to the light sensor 121 to control the output of the image intensity information. It should be further noted that, the image sensor 12 according to the first embodiment of the present invention can convert the image received by the image sensor 12 into red light, green light, and blue light through a color filter array (CFA), and generate image intensity information through the corresponding light sensor 121 to obtain a stable dynamic image 21, but the present invention is not limited hereto.

Refer to FIG. 6 and FIG. 8. Based on the identification system 100 of the first embodiment, an identification method for operating the identification system 100 of the first embodiment is further provided, which includes the following steps:

Activation step S11': the test object 200 touching the sensing area 11, and the image sensor 12 being activated and generating a dynamic image 21 for the test object 200, wherein the dynamic image 21 comprises a plurality of interval images 23, and then proceed to step S12', sensing step.

Sensing step S12': the test object 200 progressing from touching to completely covering the sensing area 11 so that the image sensor 12 further generates a perspective image 22, and then proceed to step S13', calculation step.

Calculation step S13': the processing module 14 calculating the sharpness value of the interval image 23 within the time range 31 through one of the image difference value method and the image gradient value method, and then proceed to Step S14', the identification step.

Identification step S14': the identification module 13 further determining whether the dynamic image 21 has a change process according to whether the sharpness value of the interval image 23 exceeds a threshold value; if the test object 200 has a change process and has a perspective image 22, then the identification module 13 determining that the dynamic image 21 is a biological image; otherwise, the identification module 13 determining that the dynamic image 21 is a non-biological image.

To provide a further understanding of the structural features of the present invention, the use of technical means and the expected effects, the actual execution process of the first embodiment of the present invention is described as below:

Refer to FIG. 8 in conjunction with FIG. 4 to FIG. 6. The actual execution process of the identification system 100 according to the present invention is described as follows: First, executing the activation step S11': when exposure interval 32 is 1, the test object 200 touches the sensing area 11, and the image sensor 12 is activated and generates an interval image 23-1 corresponding to the test object 200 at the exposure interval 1; then, executing the sensing step S12': in the exposure intervals 3 and 4, the test object 200 progresses from touching to completely covering the sensing area 11 and the interval images 32-3 and 32-4 are generated, and the image sensor 12 further generating a perspective image 22; then, executing the calculation step S13': the processing module 14 calculates the sharpness value of the interval images 23 within the time range 31 through one of the image difference value method and the image gradient value method, and finally executing the identification step S14': the identification module 13 further determines whether the dynamic image 21 has a change process according to whether the sharpness value of the interval image 23 exceeds a threshold value; if the test object 200 has a change process and has a perspective image 22, then the identification module 13 determines that the dynamic image 21 is a biological image; otherwise, the identification module 13 determines that the dynamic image 21 is a non-biological image.

Referring to FIG. 7, and in conjunction with FIG. 8, in the present embodiment, the present invention, based on the aforementioned identification system 100 of the first embodiment further provides an identification method for the identification system 100, which includes the following steps:

Activation step S21: when the test object 200 touches the sensing area 11, the image sensor 12 is activated and generates a dynamic image 21, wherein the dynamic image 21 includes a plurality of interval images 23, and then executes the subtraction step S22.

Subtraction step S22: the processing module 14 executes an algorithm to perform a subtraction operation on the interval images 23, and generates a subtracted signal (not shown), and then executes the identification step S23.

Identification step S23, the identification module 13 uses the subtracted signal as the basis to determine whether the identification system should be unlocked.

In order to further understand the structural features, the application of technical means and the expected effect of the present invention, the actual implementation process of the present invention is described here for in-depth and specific understanding of the present invention, as follows:

Refer to FIG. 8 in conjunction with FIG. 4 to FIG. 7. The actual execution process of the identification system 100 according to the first embodiment of the present invention is described as follows: First, the activation step S11 is executed. When the exposure interval 32 is 1, the test object touches the sensing area 11, so that the image sensor 12 is activated and generate the interval images 23-5 to 23-8 corresponding to when the exposure interval 32 is 5 to 8; then, executing the subtraction step S22, the interval image 23-8 is sharper than the previous interval images 23-5 to 23-7, and an algorithm for the interval images 23 is executed to perform a subtraction operation on the interval images 23 and generates a subtracted signal; finally, the identification module 13 uses the subtracted signal as the basis for determining whether to unlock the identification system.

It should be further noted that, the above-mentioned interval image 23 may include a plurality of single-frame images generated in the exposure interval 32, and the subtracted signal generated after performing the subtraction operation on the interval images 23 with each other may have a plurality of subtracted signals instead of a single one, the present invention can use any one of the subtracted signals as a basis for identifying whether to unlock the identification system 100. In some embodiments, when there is a plurality of subtracted signals, the average value of the subtracted signals can be used as a basis for identifying whether to unlock the identification system 100, but the invention is not limited hereto.

As can be seen from the above description that, according to the identification system 100 of the first embodiment of the present invention, the processing module 14 further executes an algorithm, and the algorithm performs the subtraction of the interval images 23 of different exposure intervals 32 from each other. Through the calculation, the ridge valley value (RV value) of the dynamic image according to the present invention is greatly improved, resulting in a better fingerprint identification effect. As such, the identification system according to the present invention improves the FAR and FRR of the identification system to achieve high accuracy and wide applicability.

Hereinafter, referring to the drawings, an embodiment of the first implementation of the identification system 100 of the present invention will be described, so that those skilled in the art of the present invention may more clearly understand possible modifications. Elements designated with the same reference numerals as above are substantially the same as those described above with reference to FIG. 1. The same elements, features, and advantages as the identification system 100 will not be repeated.

Figure 9:
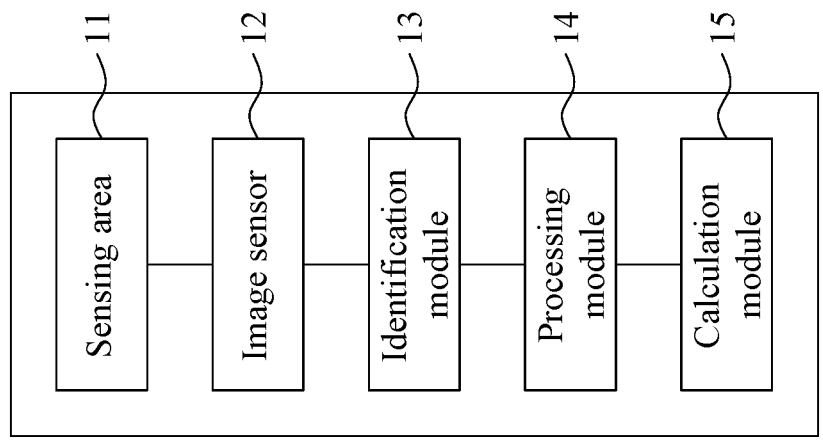
FIG. 9 is a schematic view of an identification system according to a second embodiment of the present invention.
Figure 10:
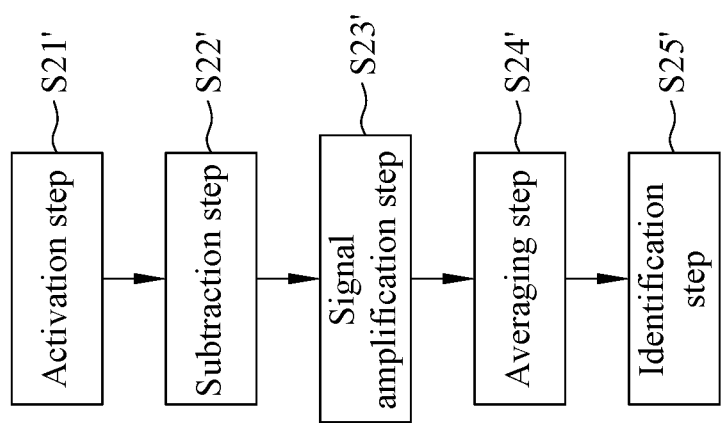
FIG. 10 is a block diagram illustrating the steps of the identification method according to the second embodiment of the present invention.
Figure 11A:
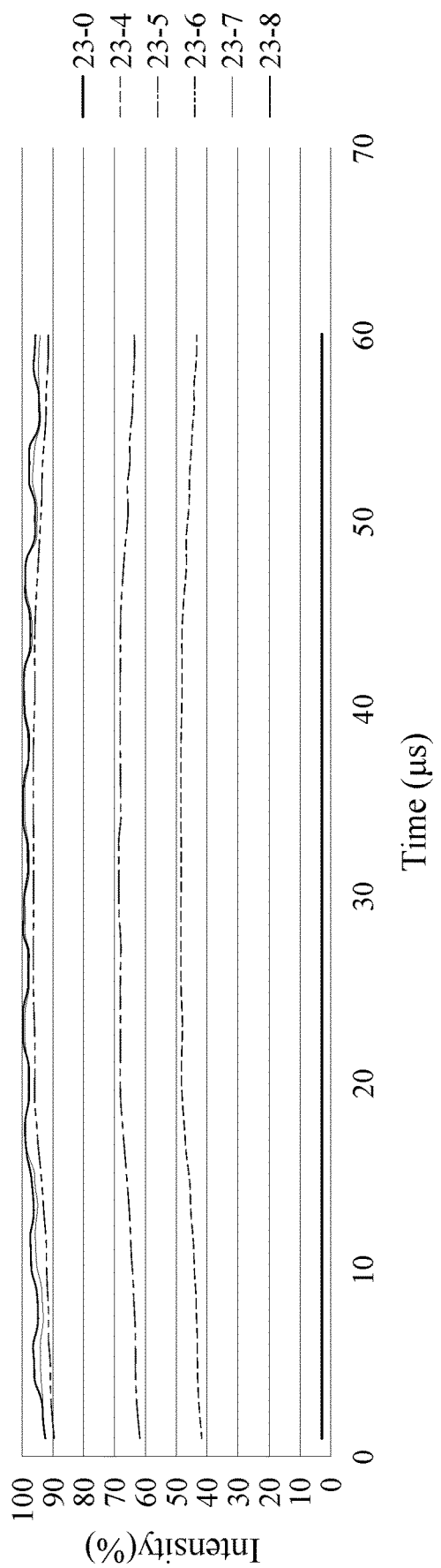
FIG. 11A is a schematic diagram illustrating an interval image according to the second embodiment of the present invention.
Figure 11B:
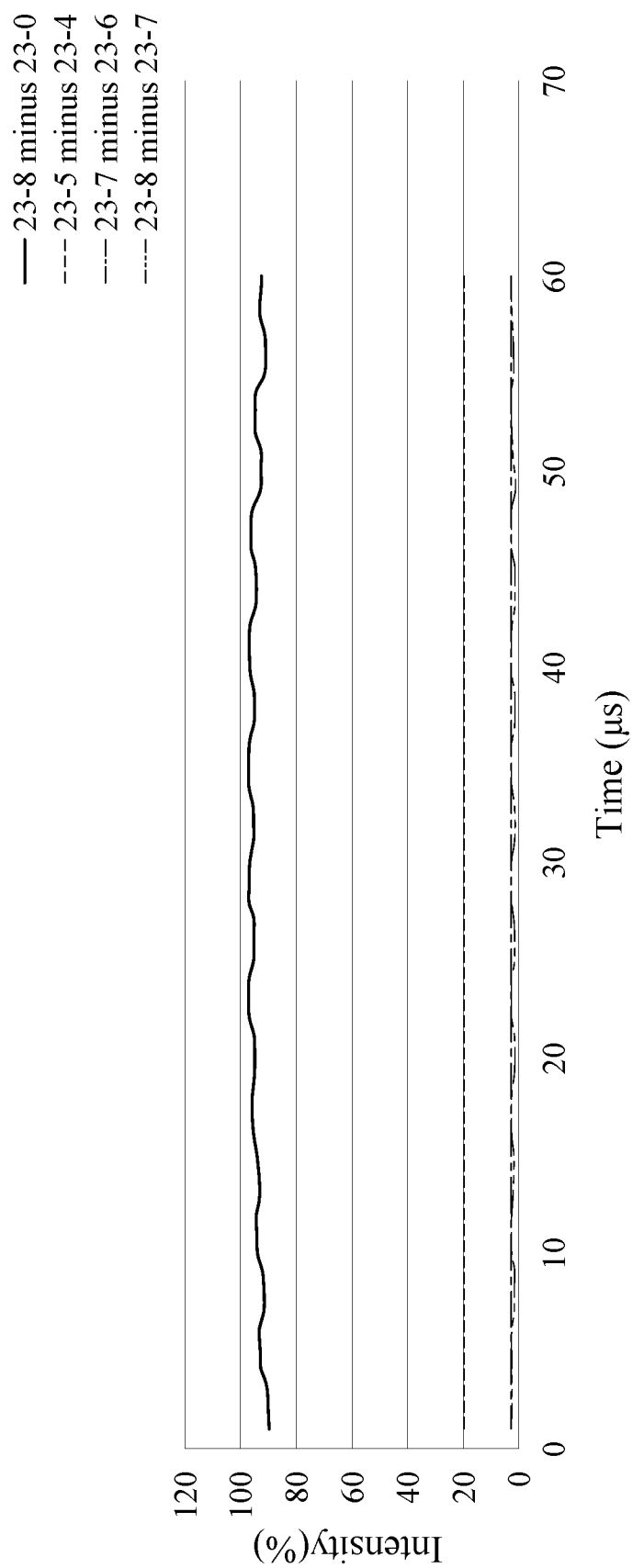
FIG. 11B is a schematic diagram illustrating after the interval image executing the algorithm according to the second embodiment of the present invention.

Refer to FIGS. 9-11B. FIG. 9 is a schematic view of an identification system according to a second embodiment of the present invention; FIG. 10 is a block diagram illustrating the steps of the identification method according to the second embodiment of the present invention; FIG. 11A is a schematic diagram illustrating an interval image according to the second embodiment of the present invention; and FIG. 11B is a schematic diagram illustrating after the interval image executing the algorithm according to the second embodiment of the present invention. As shown in FIG. 9, the identification system 100 according to the present invention includes: a sensing area 11, an image sensor 12, an identification module 13, a processing module 14, and a calculation module 15.

Specifically, the identification system 100 according to the second embodiment of the present invention further includes a calculation module 15, and the calculation module 15 according to the second embodiment of the present invention is to perform the amplification by multiply-fold on the above-mentioned subtracted signal. The calculation module 15 may be one of hardware or software with calculation functions. However, the present invention is not limited hereto.

It should be further explained that, the processing module 14 of the second embodiment of the present invention executes an algorithm to perform a subtraction operation on the interval images 23 of different exposure intervals 32 in the time range 31, and the algorithm is to subtract the intervals images 23 of the previous exposure interval 31 from the interval images 23 of the next exposure interval 32 in the time range 31, which is different from the conventional technology that only uses the interval images 23 of different exposure intervals 32 to perform addition operations to obtain an average value, or simply deducting the empty background value and then performing an addition operation to obtain an average value of the interval images 23. The identification system 100 according to the present invention can effectively eliminate the noise in the dynamic image 21, so that the RV value of the dynamic image 21 is greatly improved, thereby resulting in a better fingerprint identification effect.

It is worth mentioning that, since the processing module 14 and the calculation module 15 are both used for processing the interval images 23, in some embodiments, the products that can perform the algorithm of the subtraction operation between the interval images 23 also can usually perform multiplication on the subtracted signals. Therefore, the processing module 14 and the calculation module 15 can be combined into the same role, but the present invention is not limited to herein.

Refer to FIG. 10. The present invention, based on the identification system 100 of the second embodiment, further provides an identification method for executing the identification system 100 of the second embodiment, including includes the following steps:

In the activation step S21', when the test object 200 touches the sensing area 11, the image sensor 12 is activated and generates a dynamic image 21, wherein the dynamic image 21 includes a plurality of interval images 23; and then the subtraction step S22' is executed.

In the subtraction step S22', the processing module 14 executes an algorithm, the algorithm performs a subtraction operation on the interval images 23, and generates a subtracted signal; and then the signal amplification step S23' is executed.

In the signal amplification step S23', the subtracted signal is amplified by the calculation module 15 by multiples, and the peaks and valleys of the amplified subtracted signal are sharp and within the signal processing range; and then the averaging step S24' is executed.

In the averaging step S24', the subtracted signal is averaged through the calculation module 15, and then the identification step S25' is executed.

In the identification step S25', the identification module 13 takes the average value according to the amplified subtracted signal as the basis for determining whether to unlock the identification system.

Specifically, refer to FIG. 11A and FIG. 11B in conjunction with FIG. 8 to FIG. 10. The actual execution process of the algorithm in the identification system 100 according to the second embodiment of the present invention is described as follows: As shown in FIG. 11A, FIG. 11A is an exemplary illustration of the intensities of the interval images 23-0, 23-4 to 23-8 in the exposure interval 32 at 60 microseconds. It should be further explained that the interval image 23-0 is the image intensity information generated by the absence of any object on the image sensor 12, that is, the background value in the prior art. As shown in FIG. 11B, FIG. 11B exemplarily illustrates the interval image 23 (23-4 to 23-8) after executing the algorithm according to the second embodiment of the present invention, and the mutual comparison after deducting the interval image 23-0 of the empty background value. It can be understood that since the fingerprint identification system of the prior art only deducts the empty background value (i.e., 23-8 minus 23-0), the difference between the deducted background value and the interval image 23 is too large, so that the noise in the interval image 23 cannot be effectively deducted, and the image intensity information does not decrease significantly. On the other hand, the algorithm of the second embodiment of the present invention utilizes the interval image 23 in the next exposure interval minus the interval image 23 of the previous exposure interval 32 (23-5 minus 23-4, 23-7 minus 23-6, 23-8 minus 23-7 as shown in FIG. 11B) in the time range 31, due to the effective elimination the noise in the interval image 23, the image intensity information decreases significantly, so that the RV value of the dynamic image 21 according to the present invention is greatly improved, thereby resulting in a better fingerprint identification effect. Thereby, the FAR and FRR of the identification system 100 according to the present invention are greatly improved to achieve high accuracy and wide applicability.

In the activation step S21", when the test object touches the sensing area 11, the image sensor 12 is activated and a dynamic image 21 is generated. The dynamic image 21 includes a plurality of interval images 23; and then the selection step S22' is executed.

In the selection step S22", the processing module 14 uses one of the interval images 23 as a background interval image (not shown) through an algorithm; and then the subtraction step S23" is executed.

In the subtraction step S23", the processing module 14 executes an algorithm, and the algorithm further performs a subtraction operation on the background interval image and the interval image 23, and generates a subtracted signal; and then the signal amplification step S24" is executed.

In the signal amplification step S24", the calculation module 15 amplifies the subtracted signal by multiple-fold, and the peaks and valleys of the amplified subtracted signal are sharp and within the signal processing range, and then the averaging step S25" is executed.

In the averaging step S25", the subtracted signals is averaged by the calculation module 15, and then the identification step S26" is executed.

In the identification step S26", the identification module 13 uses the amplified subtracted signal as a basis for determining whether to unlock the identification system 100.

Figure 12:
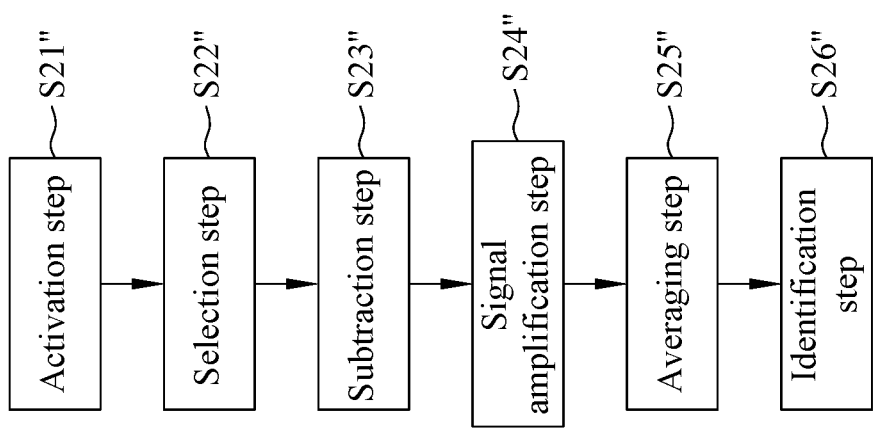
FIG. 12 is a block diagram illustrating the steps of the identification method according to the third embodiment of the present invention.
Figure 13A:
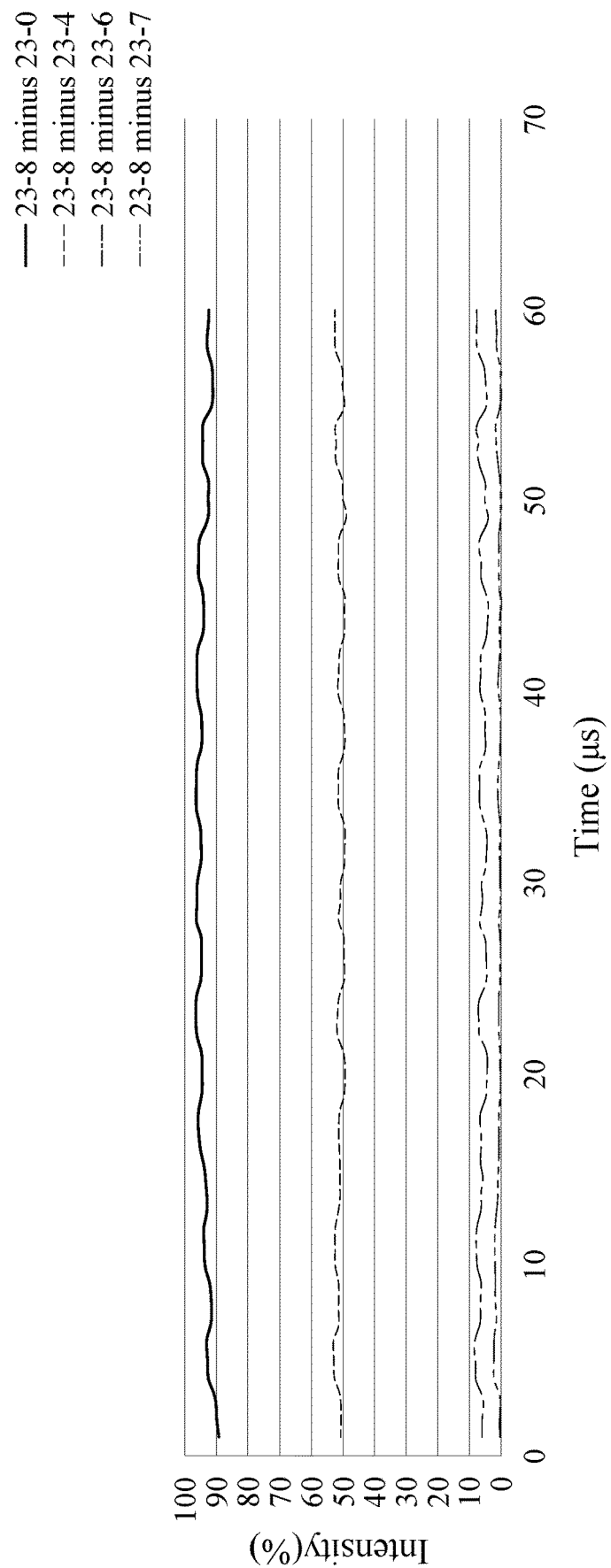
FIG. 13A is a schematic diagram illustrating after the interval image executing the algorithm according to the third embodiment of the present invention.
Figure 13B:
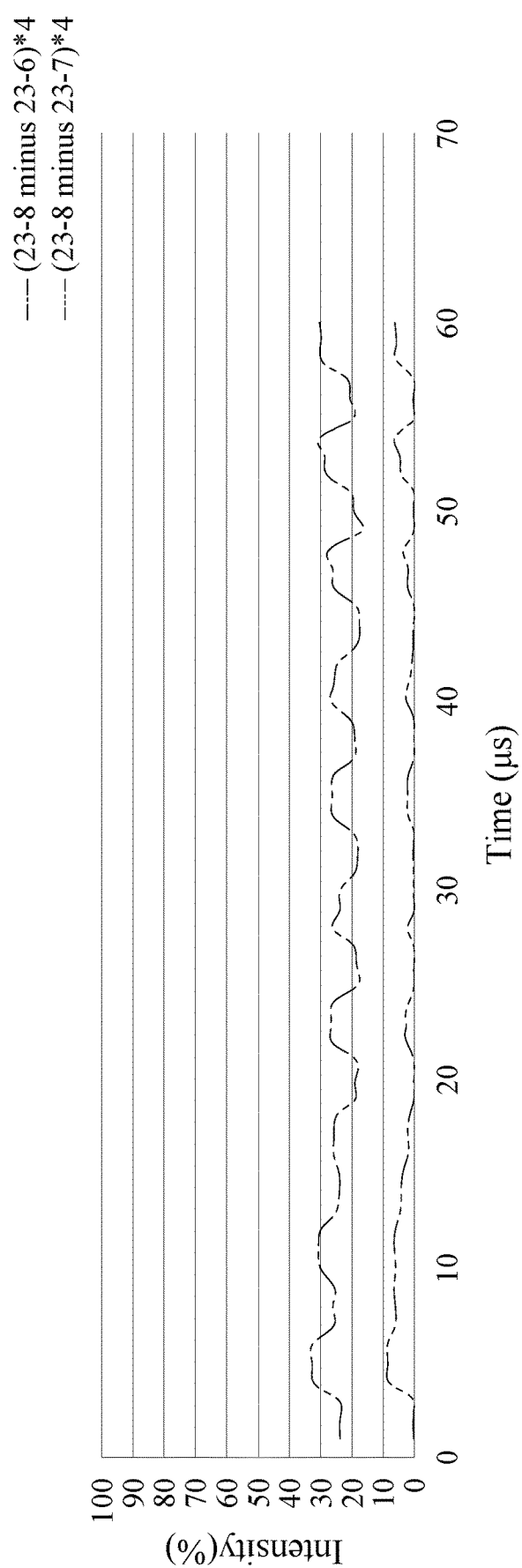
FIG. 13B is another schematic diagram illustrating after the interval image executing the algorithm according to the third embodiment of the present invention.

Specifically, refer to FIG. 13A and FIG. 13B in conjunction with FIG. 12. The actual execution process of the algorithm in the identification system 100 according to the third embodiment of the present invention is described as follows: As shown in FIG. 13A, FIG. 13A is an exemplary illustration of selecting different interval images 23 as the background interval image according to the algorithm according to the third embodiment of the present invention. Under the condition that the exposure interval 32 is 60 microseconds, the interval image 23 is compared with each other after deducting different background interval images. It can be understood that, compared with the interval image 23 of the conventional technique that only deducts an empty background value (i.e., 23-8 minus 23-0), when one of the better interval images 23 is selected as the background interval image in the selection step S22", the noise in the interval image 23 can be effectively eliminated, causing a significant drop in the image intensity information. It is worth noting that the algorithm according to the present invention can self-learn through a machine learning algorithm or a deep learning algorithm, and automatically determine and select one of the better interval images 23 as the background interval image. The algorithm can be, but not limited thereto, K-Means Clustering, Ant Colony Optimization (ACO), or Particle Swarm Optimization (PSO). As shown in FIG. 13B, FIG. 13B is an exemplary illustration of performing an amplification operation after deducting different background interval images from the interval image 23 according to the third embodiment of the present invention. Since a better interval image 23 is selected in the selection step S22" to be used as the background interval image, the peaks and valleys of the image signal of the amplified interval image 23 are sharp and within the signal processing range (shown in FIG. 13B as (23-8 minus 23-6) *4 and (23-8 minus 23-7)*4), effectively eliminating the noise in the interval image 23, resulting in a significant drop in the image intensity information, so that the RV value of the dynamic image 21 according to the present invention after the amplification operation is further improved.

In summary, the present invention has the following implementation effects and technical effects:

First, based on the identification system 100 of the present invention, combined with the identification method provided by the present invention, the image sensor 12 generates the dynamic image 21 and further the perspective image 22. The change process of the dynamic image 21 and the perspective image 22 are used to determine whether the dynamic image 21 of the test object is a biological image. As such, it can effectively prevent others from cracking the identification system with fingerprint images, pictures, or arbitrary models, and greatly increase the identification system security and identification capabilities.

Second, the identification system 100 and the identification method provided by the present invention execute an algorithm that subtracts the interval images 23 in different exposure intervals 32 from each other and takes an average value, so that the ridge valley value (RV) of the dynamic images is greatly increased, resulting in a better fingerprint identification effect. Thereby, the FAR and FRR of the identification system 100 of the present invention are greatly improved, and the goals of high accuracy and wide applicability are achieved.

Third, the identification module 13 according to the present invention differs from the prior art that uses blood vessel and vein identification as an identification method. The identification module 13 determines whether the dynamic image 21 is a biological image according to the change process of the dynamic image 21 and the perspective image 22. The double-authentication can effectively prevent others from cracking the identification system 100 with fingerprint images, pictures, or arbitrary models. At the same time, the identification results do not need to go through a complicated machine learning mechanism and accumulate a large number of identification features, making the offline identification feasibility greatly improved, as well as both wide applicability and high security.

Fourth, in the third embodiment, one of the better interval images 22 is selected as the background interval image in the selection step S23", which effectively eliminates the noise in other interval images 23, resulting in significant reduction in the image intensity information, so that the ridge valley value (RV) of the dynamic images 21 after the enlargement operation is further improved.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An identification method, applicable to an identification system having a sensing area, an image sensor, and an identification module coupled to the sensing area and the image sensor, the identification method comprising the following steps: an activation step, a test object touching the sensing area, the image sensor being activated and generating a dynamic image;
   a sensing step, the test object progressing from touching to completely covering the sensing area so that the image sensor further generates a perspective image; and
   an identification step, if the test object has a change process of the dynamic image and the perspective image, the identification module determining that the dynamic image is a biological image;
   wherein the dynamic image comprises a plurality of interval images generated by the test object in a time range and the identification module determines whether the dynamic image has the change process according to whether sharpness values of the interval images exceed a threshold value; when one of the sharpness values exceeds the threshold value, the identification module determines that the dynamic image has the change process.

2. The identification method according to claim 1, wherein the sharpness value is calculated by one of an image difference value method and an image gradient value method.

3. The identification method according to claim 1, wherein the image sensor further comprises:
   a plurality of light sensors, arranged in an array, wherein the light sensors are used to generate a plurality of image intensities information, and the dynamic image is generated by the image intensity information; and
   a plurality of complementary metal-oxide semiconductors (CMOS), coupled to the light sensors, wherein the CMOS are used to control an output of the image intensity information.

4. The identification method according to claim 3, wherein the image sensor is disposed below the sensing area, the image sensor has a shutter mechanism, and the shutter mechanism is used to control an exposure interval.

5. The identification method according to claim 4, wherein the shutter mechanism is a global shutter (GS), so that the light sensors are exposed at the same time to generate the image intensity information.

6. An identification method, applicable to the identification system according to claim 1, the identification method comprising the following steps:
   an activation step, when a test object touches the sensing area, the image sensor being activated and generating a dynamic image for the test object, wherein the dynamic image comprises a plurality of interval images;
   a subtraction step, a processing module executing an algorithm to perform a subtraction operation on the interval images with each other, and generating a plurality of subtracted signals;
   a signal amplification step, an operation module amplifying the subtracted signals by multiples, so that peaks and valleys of the amplified subtracted signals are sharp and within a signal processing range; and
   an identification step, an identification module using the amplified subtracted signals as a basis to determine whether to unlock the identification system.

7. The identification method according to claim 6, wherein after the signal amplification step is performed, the identification method further comprises:
   an averaging step, the operation module taking an average value of the subtracted signals;
   wherein the identification step further uses the identification module and the average value as the basis to determine whether to unlock the identification system.

8. The identification method according to claim 6, wherein after the activation step is performed, the identification method further comprises:
   a selection step, the processing module uses one of the interval images as a background interval image;
   wherein the subtraction step further comprises performing a subtraction operation between the background interval image and the interval images to generate the subtracted signals.

* * * * *